UNITED STATES PATENT OFFICE.

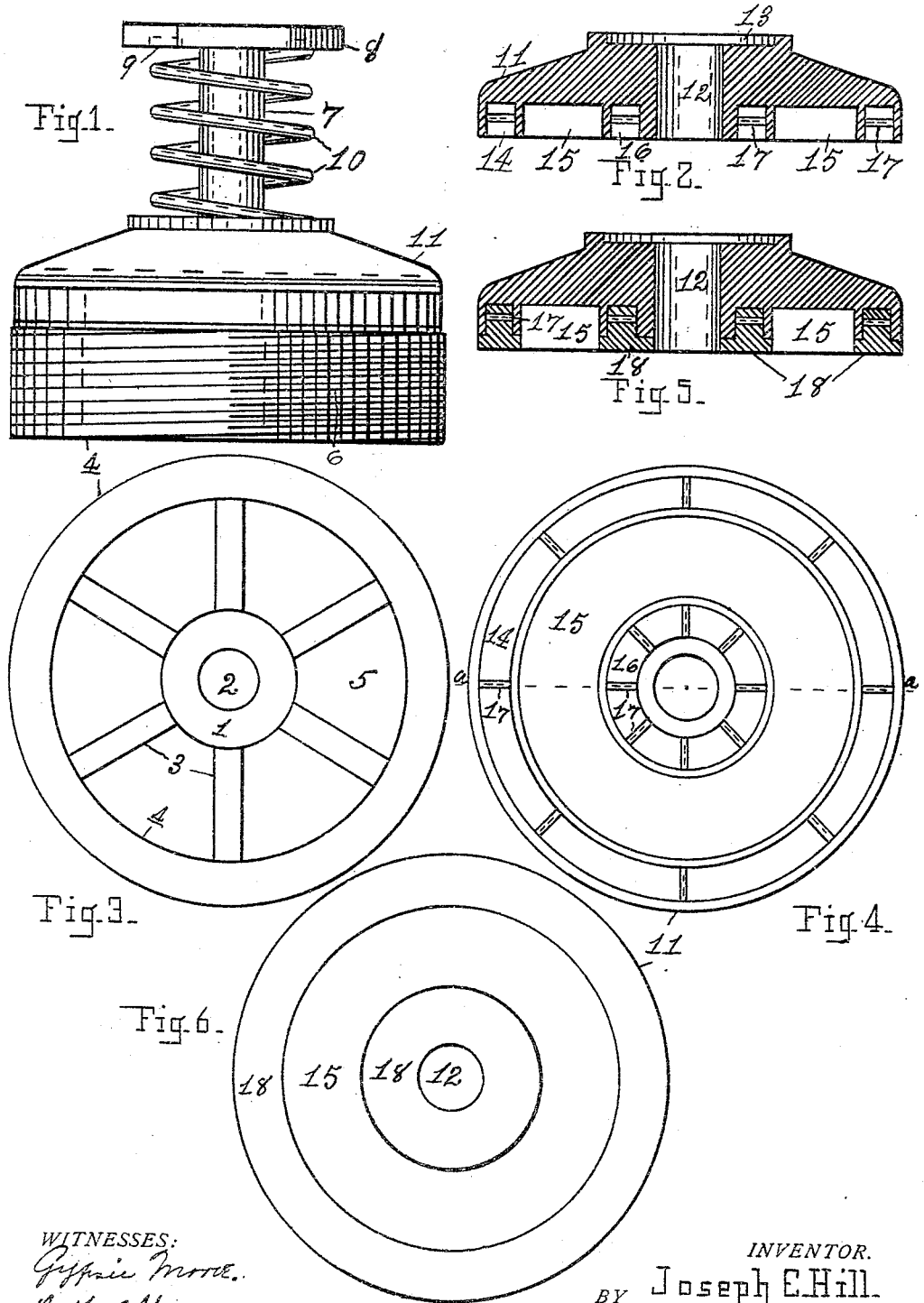

JOSEPH E. HILL, OF MENASHA, WISCONSIN, ASSIGNOR OF TWO-THIRDS TO WILLIAM M. GILBERT AND THEODORE M. GILBERT, BOTH OF NEENAH, WISCONSIN.

PUMP-VALVE.

No. 904,431.  Specification of Letters Patent.  Patented Nov. 17, 1908.

Application filed July 10, 1908. Serial No. 442,811.

*To all whom it may concern:*

Be it known that I, JOSEPH E. HILL, a citizen of the United States, residing at Menasha, in the county of Winnebago and State of Wisconsin, have invented a new and useful Pump-Valve, of which the following is a specification.

My invention relates to an improvement in pump valves.

For the successful operation of pump valves in pumping some liquids, or liquids at high temperatures, it has been found advisable to use rubber, vulcanized to various degrees of hardness, the valve being formed of a disk of rubber having a metallic plate mounted upon its upper side for stiffening the valve, but a difficulty is found in the use of this plate upon the rubber disk by reason of the opportunity for liquid to enter between said plate and the rubber disk and press directly upon the disk, causing it to become dishing, and forcing the rubber upon the face of the valve downward between the grids of the valve seat and thereby causing the valve to leak and become useless. For overcoming this difficulty, I form the valve of a metallic skeleton, having grooves for receiving the rubber, the grooves being provided with numerous anchors for retaining the material, whether it be rubber, a metal of a different quality from the valve seat, or some non-metallic material which is adapted for the purpose, and the object of the improvement is to provide a rubber, or similar faced valve that will not become dishing from use, and to lessen the cost of the valve by substituting for a part of the rubber or other material which forms the valve, a suitable metallic skeleton. I attain these objects by the construction shown in the accompanying drawing, in which,—

Figure 1 is a side elevation of a valve mounted upon its seat. Fig. 2 is a vertical section of the valve skeleton on the line *a, a,* of Fig. 4. Fig. 3 is a plan of the valve seat. Fig. 4 is a plan of the meeting face with the valve seat, of the valve skeleton, the skeleton being unfilled. Fig. 5 is a vertical section on the line *a, a,* of Fig. 4, of the skeleton filled ready for use. Fig. 6 is a plan of the working face of the valve skeleton, filled ready for use.

Similar numerals indicate like parts in the several views.

The valve seat is of a usual type, cast of a metal suited for its use, brass being generally used, and consists of a hub 1, having a central bore 2, grids 3, a rim 4, and several openings 5, for the passage through them of the liquid to be pumped, the rim being provided with threads 6, for its engagement with the valve deck.

The valve seat is provided with a bolt 7, which is tapped into the bore 2, and is provided with a large head 8, having a socket 9, for receiving one end of a spiral spring 10. The valve skeleton 11, may be cast of brass or other metal suited for its use in the liquid to be pumped, be of a diameter suited for its seat, and consists of a convex surfaced body having a central bore 12, suited for a vertical movement of the body upon the bolt 7, a socket 13, for receiving an end of the spring 10, and upon its lower side is provided with annular grooves 14, 15 and 16, the grooves 14 and 16, having arranged across them a series of anchors 17, for the retention in said grooves of rubber, or other suitable filling that is adapted to form a durable wearing surface for the valve. It will be observed that these anchors have a clear space entirely around them, so that any melted material which may be poured into the grooves can surround the anchors and when hardened, be securely held by them within the grooves.

The grooves 14 and 16 are to be filled with a melted material, as 18, which may be rubber, vulcanized to the required degree of hardness, or for brewers' use and where liquid of a high degree of temperature is required to be pumped, block tin will serve a very good purpose, although I do not confine this improvement to the use of any one material. The filling 18 is to fill the grooves and extend over their walls to a thickness of an eighth of an inch, more or less, as is shown in Fig. 5, so as to present a surface for covering the entire surface of the valve seat with which the valve comes in contact.

For most purposes, rubber will be used for forming the filling for the grooves 14 and 16. This is to be inserted into said grooves when in a semi-plastic state, vulcanized therein, and is subjected to a pressure of about 2300 pounds per square inch, thereby requiring a very rigid and strong walled inclosure for sustaining such pressure, the anchors not only serving their purpose as anchors, for the filling, but also, being inserted in the mold before casting, they serve to prevent the walls of the grooves from spreading when subjected to the pressure above described.

It will be noticed that around the central part of the skeleton, there is quite a body of metal, which is for the purpose of providing a valve that cannot be dished by any pressure likely to be imposed upon the valve. This filling 18, should be of another kind than the valve seat, or if of metal, be of a softer quality than that of which the valve seat is composed, as a difference in quality produces better results than when both are of the same degree of hardness.

Having described my invention, what I claim and desire to secure by Letters Patent, is,—

1. A circular convex upper surfaced metallic skeleton for a valve having an increased body of metal around its central portion, a plurality of annular grooves around the lower, or working face of the valve, a series of anchors arranged in a radial direction across the inner and outer ones of said grooves, having a clear space entirely around each anchor, said inner and outer grooves being adapted for receiving and holding a suitable filling, which can be forced into them under great pressure and project below the walls of said grooves and form the working face of the valve, substantially as described.

2. A pump valve, consisting of a circular and convex upper surfaced metallic skeleton having an increased body of metal around its central portion, an inner and outer groove around the lower, or working face of the skeleton, a plurality of anchors extending in a radial direction across each of said inner and outer grooves having each a clear space entirely around it, a filling engaging said anchors in said inner and outer grooves of a material of a different quality from that of the material which forms the valve seat, it extending below the walls of said grooves and forming the working face of the valve, substantially as set forth.

3. A pump valve, consisting of a circular, convex upper surfaced metallic skeleton having an increased body of metal toward its center, a plurality of annular grooves around the lower, or working face of the skeleton, a plurality of anchors extending in a radial direction across each of the inner and outer grooves, having each a clear space entirely around it, a melted filling in said inner and outer grooves of a different material from that which forms the valve seat which surrounds said anchors, extends below the walls of said grooves and forms when hardened to the proper degree the working face of the valve, substantially as described.

JOSEPH E. HILL.

Witnesses:
R. J. FINNEY,
HARRY DE WOLF.